United States Patent [19]

Fell

[11] Patent Number: 4,553,334
[45] Date of Patent: Nov. 19, 1985

[54] UNIVERSAL DOWEL PIN SYSTEM
[75] Inventor: Edwin H. Fell, Pensacola, Fla.
[73] Assignee: Westinghouse Electric Corp., Pittsburgh, Pa.
[21] Appl. No.: 576,680
[22] Filed: Feb. 3, 1984
[51] Int. Cl.⁴ .................................................. G01B 3/00
[52] U.S. Cl. ...................................... 33/181 R; 33/549
[58] Field of Search ....... 33/185 R, 174 TA, 174 TB, 33/174 R, 181 R, 180 R, 568, 570, 549

[56] References Cited

U.S. PATENT DOCUMENTS

| | | | |
|---|---|---|---|
| 2,707,419 | 5/1955 | Schron | 269/47 |
| 3,770,261 | 11/1973 | Anderson | 269/47 |
| 3,785,634 | 1/1974 | Denker | 33/174 TA |
| 3,942,780 | 3/1976 | Clement | 269/47 |
| 4,121,817 | 10/1978 | Pavlovsky | 269/296 |
| 4,191,366 | 3/1980 | Rabin | 269/47 |
| 4,286,778 | 9/1981 | Fullmeyer | 269/91 |

Primary Examiner—Harry N. Haroian
Attorney, Agent, or Firm—Daniel C. Abeles

[57] ABSTRACT

A universal dowel pin system (10) for properly aligning any one of a plurality of workpiece fixtures (12) relative to a machine tool table (14) comprises a dowel pin (20) which has a square-shaped base section (22) adapted to be dimensionally customized so that the width dimension thereof is substantially the same as the width dimension of the space defined between the sidewalls (18) of the machine tool table T-slot (16), while the upper pin section (24) of the dowel pin (20) has a diametrical dimension which is substantially the same as the uniform or standardized diametrical dimension of a bore (30) which may be defined within an insert (28) or directly defined within the particular workpiece fixture (12). In this manner, as all of the different workpiece fixtures (12) all have the same standardized bore (30), and the pin section (24) of each dowel pin (20) has the same dimensional value for mating with the standardized bore (30), once a particular machine tool table (14) is provided with its particular dowel pin (20), the machine tool table (14) may be universally utilized in connection with a plurality of different workpiece fixtures (12). The bottom sections (22) of the dowel pins (20) will all have customized dimensions to match those of the particular machine tool table T-slots (16), but all upper sections (24) of all the dowel pins (20) will have the same dimension whereby a plurality of machine tool tables (14) will individually universally mate with a plurality of different workpiece fixtures (12).

20 Claims, 1 Drawing Figure

U.S. Patent     Nov. 19, 1985     4,553,334
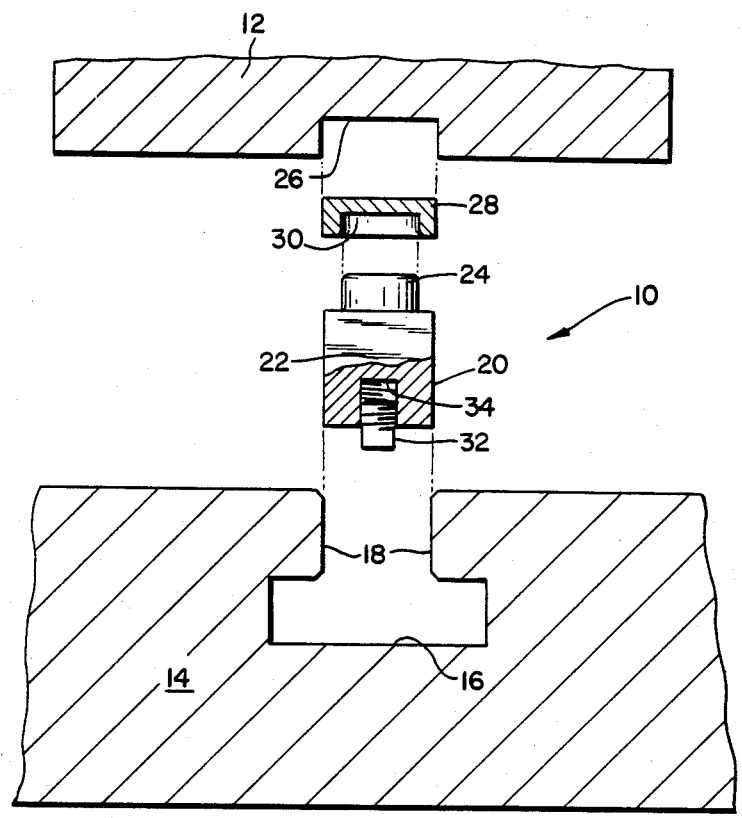

UNIVERSAL DOWEL PIN SYSTEM

BACKGROUND OF THE INVENTION

1. Field of the Invention

The present invention relates generally to machine tools, and more particularly to a new and improved universal dowel pin system which may readily be defined between, or incorporated within, any machine tool table and any workpiece fixture which is desired to be fixedly, yet removably, secured to any particular type of machine tool table so as to readily be capable of insuring the proper and accurate alignment between any type of workpiece fixture and any type of machine tool table with which the particular type of workpiece fixture is desired to be utilized.

2. Description of the Prior Art

Machining is a common industrial process for ultimately producing desired products from original stock material. The stock material may be, for example, fabricated from a suitable metal, and is usually, or at least often, in solid form. While workpieces vary in form or shape, finish, or the like, depending upon the number and particular type of machining or fabrication processes to which they have been subjected, the most basic or crudest type of workpiece simply comprises a predeterminedly sized piece of raw material severed, for example, from the larger bulk stock material. Subsequently, various machining or fabrication processes may be effected in connection with the original workpiece, and at each stage of development of the workpiece toward the finally desired product, the object being worked upon or machined is still referred to as the workpiece. Machining is thus concerned with the controlled removal of material from a particular workpiece, at any particular stage or state of its development, in accordance with predetermined plans or designs so as to ultimately yield the final, desired work product. Examples of the various machining or fabrication processes include boring, grinding, drilling, planing, shaping, turning, or the like, and the various machining operations are accomplished or achieved by means of various different types of machines, better known in the art as machine tools. Examples of such various machine tools, for performance of the aforenoted exemplary machining operations, include drill presses, vertical and horizontal milling machines, lathes, various types of grinders, planers, shapers, or the like.

In order to perform the particularly desired machining operation upon a particular workpiece, a cutting tool and the workpiece must be operatively engaged in a predetermined manner, and consequently, this is the basic function of a machine tool, that is, to bring the cutting tool and the workpiece together so that the former may in fact machine the latter. Depending upon the particular machine tool, either the cutting tool may be moved relative to the workpiece, or conversely, the workpiece may be moved relative to the cutting tool, or still further, relative movements of both the cutting tool and the workpiece with respect to each other may be effectuated. The cutting tool is, of course, mounted upon the machine tool in a predisposed manner, and consequently, in order to therefore facilitate the proper engagement to be defined between the cutting tool and the workpiece, the workpiece must be properly disposed upon the machine tool. This orientation or relative disposition of the workpiece with respect to the machine tool, and therefore, the cutting tool thereof, is conventionally achieved by providing the machine tool with, for example, a flat work support surface or table, and in the common instance wherein the workpiece has an irregular, arcuate, or the like, lower or bottom surface which would normally preclude the fixation of the workpiece to the machine tool table in a stable mode, there is additionally provided a suitable workpiece fixture within which the workpiece is fixedly secured and wherein the fixture is adapted to be affixed to the machine tool table in a properly aligned mode or disposition. As may readily be appreciated, however, there are numerous different types of workpiece fixtures which are especially adapted for use with specific types of workpieces, and still further, there are numerous manufacturers of such different types of workpiece fixtures. Consequently, it may be further appreciated or realized that the various different fixtures being manufactured by means of the different particular manufacturers will have individually different means for securing the fixtures to the machine tool tables. In a similar manner, the particular type of machine tool, along with its particular table, can of course be manufactured by means of numerous different manufacturing companies. Consequently, the particular means provided upon the particular type of machine tool table for operatively mating with the aforenoted workpiece fixtures in order to properly affix and align the fixture with respect to the machine tool table will vary depending upon the particular manufacturer of the machine tool.

In particular, in accordance with conventional practices, machine tools, such as, for example, milling machines, are provided with tables having a plurality of slots, arranged in parallel, extending the entire length of the table. The slots have a substantially inverted T-shaped configuration within which substantially inverted T-shaped nuts are adapted to be disposed. Threaded bolts, disposed within recessed or countersunk areas of the fixture, are adapted to be threadedly engaged with the T-shaped nuts whereby the particular workpiece fixture is secured to the machine tool table. This securement system, however, only serves to in fact fixedly secure the workpiece fixture to the machine tool table in an essentially lock-down mode, and does not serve to accurately align the workpiece fixture relative to the machine tool table. This of course becomes critical when workpieces requiring close or accurate tolerances are being machined.

In order to achieve the particularly required accurate alignment between the workpiece fixture and the machine tool table, as defined, for example, between the respective centerlines of the workpiece fixture and the machine tool table, closely toleranced alignment keys are provided in connection with the workpiece fixtures and the machine tool tables. In particular, the conventional keys were fabricated in the form of an upstanding block having a stepped configuration as seen from a vertical cross-section thereof as defined by means of upper and lower different-sized rectangularly configured sections as viewed in horizontal cross-section. The lower, larger block section would be disposed within the machine tool table T-slots between the side walls thereof defining the upstanding stem portion of the slot's T, while the upper, smaller block section would be disposed within an elongated, rectangularly configured key slot defined within the particular fixture. The machine tool table T-slots are of course formed within the table by means of the manufacturer of the machine tool, and similarly, the elongated slots defined within the fixtures are formed therein by means of the fixture manufacturers. In some instances, however, such elongated slots were not formed within the fixtures by means of the fixture manufacturers, and consequently, such slots would have to be formed within the fixtures by the machine tool personnel utilizing the particular fixture. In either case, it can readily be recognized that in view of the fact that various different machine tools are being manufactured by various different manufacturing companies, and similarly, various different workpiece fixtures are being manufactured by various different manufacturing companies, there existed a complete absence of any uniformity with respect to the particularly sized machine tool table T-slots and workpiece fixture key slots defined within the machine tool tables and workpiece fixtures, respectively. As a result, in order to effectively utilize a particular workpiece fixture in connection with a particular machine tool table, an extensive inventory of custom-made alignment keys had to be established within each machine shop or department in order to accommodate the various interchangeable permutations and combinations of machine tool tables and workpiece fixtures that would be utilized together at any particular time in connection with the performance of any particular machining operation upon a workpiece. Fabricating such an extensive requisite inventory is not only obviously extremely expensive, but in addition, maintaining and storing such an available inventory is likewise expensive. Still further, it was experienced that considerable amounts of time were being required to be expended by machine shop or department personnel in locating or determining the particularly correct alignment key which would properly interface with both the particular machine tool table and the particular workpiece fixture, and in addition, for transporting the same from inventory control to, for example, the workshop within which the machine tool and workpiece fixture were disposed. All of these factors, naturally, were eventually reflected in the production costs of the particular end work products being fabricated, and therefore, the ultimate price at which the work products would be sold.

Accordingly, it is an object of the present invention to provide a new and improved universal dowel pin system.

Another object of the present invention is to provide a new and improved universal dowel pin system which is capable of being utilized in conjunction with any one particular type of various different types of machine tools so as to be capable of accurately aligning any one particular type of various different types of workpiece fixtures with the one particular type of machine tool table.

Yet another object of the present invention is to provide a new and improved universal dowel pin system which is capable of being utilized in conjunction with any one particular type of various different types of machine tools so as to be capable of accurately aligning any one particular type of various different types of workpiece fixtures with the one particular type of machine tool table in such a manner that machine tool operators or personnel will not experience the disadvantages, drawbacks, and inconveniences of conventional dowel pin systems defined between machine tool tables and the workpiece fixtures.

Still another object of the present invention is to provide a new and improved universal dowel pin system which is capable of being utilized in conjunction with any one particular type of various different types of machine tools so as to be capable of accurately aligning any one particular type of various different types of workpiece fixtures with the one particular type of machine tool table whereby extensive inventories of alignment dowel pins or keys, in order to accommodate any particular workpiece fixture which may be desired to be mounted upon any particular machine tool table, will be able to be substantially reduced.

Yet still another object of the present invention is to provide a new and improved universal dowel pin system which is capable of being utilized in conjunction with any one particular type of various different types of machine tools so as to be capable of accurately aligning any one particular type of various different types of workpiece fixtures with the one particular type of machine tool table in a very simplified manner.

Still yet another object of the present invention is to provide a new and improved universal dowel pin system which is capable of being utilized in conjunction with any one particular type of various different types of machine tools so as to be capable of accurately aligning any one particular type of various different types of workpiece fixtures with the one particular type of machine tool table as a result of standardizing the interfitting interfaces of the universal male dowel pin of the present invention and the female socket of each workpiece fixture.

A further object of the present invention is to provide a new and improved universal dowel pin system which is capable of being utilized in conjunction with any one particular type of various different types of machine tools so as to be capable of accurately aligning any one particular type of various different types of workpiece fixtures with the one particular type of machine tool table whereby, as a result of standardizing the interfitting interfaces of the universal male dowel pin of the present invention and the female socket of each workpiece fixture, different workpiece fixtures can be readily interchanged with respect to the one particular type of machine tool table.

SUMMARY OF THE INVENTION

The foregoing and other objectives are achieved in accordance with the present invention through the provision of a new and improved universal dowel pin system which comprises a dowel pin or key which is adapted to be disposed or oriented vertically upwardly so as to be simultaneously engaged with the machine tool table and the workpiece fixture whereby the workpiece fixture can be properly aligned or oriented relative to the machine tool table. The dowel pin or key includes a lower or base section which has a substantially square-shaped configuration as seen in horizontal cross-section, and an upper section, integrally formed with the lower section, which has a substantially circular-shaped configuration as seen in horizontal cross-section. The dowel pin-key base section therefore defines a rectangular parallelepiped, while the upper pin section defines a right cylinder, the diameter of the cylindrical pin being less than the corresponding side width dimension of the dowel key base section.

The side width dimension of the dowel pin-key base section is predetermined such that the base section of the dowel pin-key will be closely toleranced with respect to the laterally spaced sidewalls of the particular machine tool table T-slot within which the dowel pin-key base section will be disposed in a snug slip-fit manner. In a similar manner, the upper pin section of the dowel pin-key has a diametrical dimension which is closely toleranced with a socket defined within the workpiece fixture whereby the dowel pin-key pin section will likewise be disposed within the workpiece fixture socket in a snug slip-fit manner. In the instance that the particular workpiece fixture to be utilized in conjunction with the particular machine tool table was manufactured without a key slot being provided or defined therein, then in accordance with the present invention, the particular workpiece fixture will be simply provided with a suitably dimensioned blind bore or socket into which the upper cylindrical pin section of the dowel pin-key may be disposed. Alternatively, in the instance that the particular workpiece fixture has already been provided with a longitudinally extending key slot as a result of the manufacturing process thereof, then in accordance with the present invention, the blind bores or sockets will be defined within a cylindrically configured metal insert which is adapted to be permanently affixed within the workpiece fixture by means of a sweat-fit process and at a location such that the axis of the cylindrical insert will be disposed upon the longitudinal axis of the workpiece fixture key-slot. A bore, having a diameter which is greater than the lateral width of the workpiece fixture key-slot, will be defined within the workpiece fixture so as to house or accommodate the metal insert in the aforenoted sweat-fit mode, and consequently, once fixedly seated within the workpiece fixture, the dowel pin-key pin section can mate with the insert in the aforenoted snug slip-fit manner.

It is to be noted that in accordance with the primary feature of the present invention, the pin section of all of the dowel pin-keys of the present invention will all be fabricated so as to have the same outside diameter (O.D.) dimension, and in a similar manner, the inside diameter (I.D.) of all of the metal insert bores or sockets will likewise be provided with the same dimension for close tolerance fitting or mating with the dowel pin-key pin sections. In the instance wherein the workpiece fixtures were not originally provided with key slots, the bores or sockets defined within the workpiece fixtures in accordance with the present invention will likewise be provided with the same diametrical dimension for similar close tolerance fitting or mating with the dowel pin-key pin sections. In this manner, it can readily be appreciated that all of the different types of workpiece fixtures are now provided with standardized or uniform-sized key or pin sockets for close-tolerance reception of standardized or uniform-sized dowel pin-key pin sections of dowel pin-keys utilized within various different machine tool tables. The only part of the entire universal dowel pin system of the present invention which need be custom-made or custom-dimensioned is the base section of each dowel pin-key so as to match the particular width dimension defined between the sidewalls of the T-slot stem defined within the various different machine tool tables. The reason that the machine tool tables are not modified as are the workpiece fixtures is that it is not at all desirable to possibly or potentially interfere with or destroy the trueness, squareness, or inherent alignment which is characteristic of the machine tool table as a result of its manufacture. Consequently, once the machine tool tables have been provided with their specific or custom-made dowel pin alignment key base sections, any and all workpiece fixtures, modified in accordance with the present invention through the provision of a standardized or uniform-sized bore or pin socket, can be readily accurately aligned with respect to any machine tool table as a result of engagement between the workpiece fixture pin socket and the pin section of the machine tool table dowel pin-key.

BRIEF DESCRIPTION OF THE DRAWINGS

Various other objects, features, and attendant advantages of the present invention will be more fully appreciated as the same becomes better understood from the following detailed description when considered in conjunction with the accompanying drawing, wherein:

THE SOLE FIGURE is a vertical cross-sectional view of the new and improved universal dowel pin system constructed in accordance with the present invention and showing the cooperative parts thereof for relative use within a workpiece fixture and a machine tool table.

DESCRIPTION OF THE PREFERRED EMBODIMENT

Referring now to the drawing, there is shown in the SOLE FIGURE thereof the new and improved universal dowel pin system of the present invention, generally indicated by the reference character 10, whereby proper centerline alignment of a particular workpiece fixture 12, within which a suitable workpiece, not shown, is adapted to be fixedly mounted, may be achieved with respect to a machine tool table 14. The machine tool table 14 may be, for example, the table of a vertical milling machine, while the fixture may be any suitable milling machine fixture, vise, superspacer, dividing head, V-block, or the like. As is well known, machine tool tables such as the exemplary table 14 are provided with a plurality of inverted, substantially T-shaped slots 16 which extend the entire length of the table 14, only one such slot 16, however, being shown. Substantially T-shaped, inverted, nuts, not shown, are adapted to be disposed within the T-shaped slots 16, and suitable bolts or cap screws, also not shown, are adapted to be threadedly mated with the inverted T-shaped nuts. The bolts or cap screws are conventionally adapted to be disposed within recessed or countersunk portions, not shown, defined within the particular workpiece fixture 12, and in this manner, the workpiece fixture 12 is capable of being fixedly secured to the particular machine tool table 14. As is also well known, however, the aforenoted nut and bolt system defined between the workpiece fixture 12 and the machine tool table 14 simply define a means for fixedly securing or locking together the particular workpiece fixture 12 and the particular machine tool table 14, however, such system does not in fact serve to properly align the workpiece fixture 12 with respect to the machine tool table 14 such that machining operations may then be performed upon the workpiece mounted within the workpiece fixture 12. The reason for this is due to the fact that the nut and bolt system defined between the workpiece fixture 12 and the machine tool table 14 are not closely toleranced with respect to the workpiece fixture 12 and the machine tool table 14. Consequently, in order to in fact achieve accurate alignment between the workpiece fixture 12 and the machine tool table 14, conventional alignment keys, not shown, have been provided for conventional disposition between the upper sidewalls 18 defining the stem portion of the inverted T-shaped slots 16 provided within the machine tool table 14, and for simultaneous disposition within suitable key slots, not shown, which may be defined within the workpiece fixtures 12. In the instances that such key slots were not in fact defined or provided within the workpiece fixtures 12 by means of the workpiece fixture manufacturer, the machine shop personnel, for example, who seek to utilize a particular workpiece fixture 12 will provide or define such key slots within the workpiece fixtures 12. In either case, the problem with such a conventional key alignment system resides in the fact that depending upon the particular manufacturer of the particular fixture 12, or the machine shop personnel, as well as the particular manufacturer of the particular machine tool table 14, the key slots defined within the workpiece fixtures 12, as well as the T-slots defined within the machine tool tables 14, will all have different dimensional values. Consequently, in order to attain the proper alignment between the various fixtures 12 and the machine tool tables 14, an entire set of individually customized alignment keys have to be fabricated to the particular dimensions of the various workpiece fixtures 12 and the machine tool tables 14. This system obviously entails considerable fabrication costs, as well as substantial inventory supply and storage problems.

In accordance then with the present invention, wherein there is disclosed the new and improved universal dowel pin system 10, each of the alignment keys or dowel pins 20 comprises a substantially square-shaped base section 22, as may be viewed in a horizontal cross-section, and an upper cylindrical pin section 24 integrally formed therewith, the diametrical extent of the pin section 24 being less than the side width dimension of the base section 22. The height of the alignment key or dowel pin 20 may be, for example, one inch (1.000") as measured from the bottom surface of the base section 22 to the top surface of the pin section 24, and in accordance with one of the primary features of the present invention, the diametrical extent of every pin section 24 of every alignment key or dowel pin 20 is 0.4995 inches. Consequently, regardless of the particular workpiece fixture 14 into which the alignment key pin section 24 will be disposed, the size of the pin section 24 is uniform or standardized. In order to in fact facilitate proper mating of the alignment key pin section 24 with the workpiece fixture 12 in a closely toleranced manner, and in the instance that the particular fixture 12 has not previously been provided with a key slot by means of the workpiece fixture manufacturer, then in accordance with the present invention, each and every fixture 12 which does not have a key slot defined therein is counterbored to a depth, for example, of 0.125 inches, wherein the counterbore has a diametrical extent of 0.5000 inches. The height of the alignment key pin section 24 is 0.250 inches, and thus, the key pin section 24 will be seated within the counterbore with a diametrical clearance of 0.0005 inches, such thereby defining a closely toleranced, snug slip fit. As may thus be appreciated, each and every workpiece fixture is similarly standardized with a uniformly sized counterbore, and consequently, regardless of the particular workpiece fixture which is to be utilized in connection with a particular machine tool table 14, the fixture may be readily employed and accurately aligned with respect to the machine tool table 14 by means of the alignment key 20 of the present invention.

In the instance that a particular workpiece fixture 12 has been previously provided with a longitudinally extending alignment key slot by means of the manufacturer during the manufacturing process, or alternatively, has been provided with an alignment key slot by machine shop personnel subsequent to manufacture of the workpiece fixture, then in accordance with the present invention, a counterbore 26, having a diametrical extent of 0.999 inches, is machined into the lower surface of the workpiece fixture. Conventional key slots previously machined within workpiece fixtures normally have a maximum width dimension of 0.750 inches, so consequently, in accordance with the present invention, the counterbore 26 may be appropriately superimposed over or upon the conventional key slot defined within the lower surface of the workpiece fixture 12 and nevertheless be entirely appropriately serviceable for the purposes of the present invention. The height or depth of the counterbore 26 is 0.250 inches, and the counterbore 26 is adapted to receive an insert or adaptor 28 which also has a height dimension of 0.250 inches. The insert or adaptor 28 is cylindrical in configuration, and the diametrical extent thereof is 1.000 inches. The insert or adaptor 28 is therefore adapted to be sweat-fitted within the bore 26 so as to be permanently affixed therewithin. A counterbore or recess 30 is, in turn, defined within the lower surface of the insert or adaptor 28, and the diametrical extent of counterbore 30 is 0.5000 inches, with the height or depth thereof being 0.125 inches. In this manner, each and every one of the workpiece fixtures 12 may be provided with uniform or standardized inserts or adaptors 28 having uniform or standardized counterbores 30 for mating with the uniform or standardized alignment key pin sections 24 in a closely toleranced snug slip-fit manner. Therefore, it may readily be appreciated that once all of the fixtures 12 have been accordingly modified or standardized in accordance with the teachings of the present invention as noted hereinbefore, any and all fixtures 12 may be readily utilized in conjunction with a particular machine tool table 14.

In order to provide for the reception of the alignment key or dowel pin 20 of the present invention within a particular machine tool table 14, the base section 22 of a particular alignment key or dowel pin 20 must be custom-fitted with respect to the particular width dimensions of the particular machine tool table 14. In the illustrated embodiment, for example, the width dimension or lateral spacing defined between the sidewalls 18 of the machine tool table T-slot stem portion is 0.6250 inches, and consequently, the base section 22 of the alignment key or dowel pin 20 will have a width dimension of 0.6245 inches. It is therefore to be appreciated that the base sections 22 of all of the alignment keys or dowel pins 20 must be dimensionally customized in order to be properly accommodated in a snug slip-fit mode within particular machine tool tables 14. The base sections 22 cannot be standardized or rendered uniform as was the case of the upper pin sections 24 in view of the fact that the dimensions of the T-slot sidewall lateral spacing will vary from one machine tool table to another, and it is not at all desirable to provide the machine tool tables 14 with inserts or adaptors similar to inserts or adaptors 28 in view of the fact that the trueness, squareness, or inherent alignment of the machine tool table 14, as determined during its manufacture, could be irrevocably altered. Therefore, once particular alignment keys or dowel pins 20 have been fabricated for particular machine tool tables 14, any and all fixtures 12 may be utilized in conjunction with such machine tool table 14. It is to be noted that in connection with the seating of the alignment key pin section 24 within the insert or adaptor bore 30, or alternatively within the fixture 12 per se, there is defined an annular wear surface of 360° as opposed to conventional two-surface-contact wear surfaces defined between the conventional rectangular or square-shaped keys and the key slots defined within the workpiece fixtures. Such an arrangement, of course, serves to prolong the service life of the alignment keys 20.

A last feature of the present invention to be disclosed is that in order to properly seat the alignment keys 20 within the inverted T-slots 16 of the machine tool table 14 such that the keys are disposed in contact with the bottom horizontal surface or floor of the T-slots 16 while nevertheless being capable of properly operationally interfacing with the workpiece fixture 12, a height adjustment screw 32 may be threadedly disposed within a threaded blind bore 34 defined within the lower surface of the alignment key base section 22. In addition, it is to be noted that in order to properly align the particular fixture 12 with respect to the machine tool table 14, at least two alignment key systems 10 in accordance with the present invention should be employed between the table 14 and the particular fixture 12.

Obviously, many modifications and variations of the present invention are possible in light of the above teachings. It is therefore to be understood that within the scope of the appended claims, the present invention may be practiced otherwise than as specifically described herein.

I claim:

1. A universal dowel pin system for properly aligning, by means of any one of a plurality of different dowel pins, any one of a plurality of different workpiece fixtures with respect to any one of a plurality of different machine tool tables in connection with which it is desired to employ said any one of said plurality of different workpiece fixtures, comprising:

slot means defined within said any one of said plurality of different machine tool tables, the width dimension of said slot means defined within said any one of said plurality of different machine tool tables being singularly specific to said any one of said plurality of different machine tool tables and different from the width dimension of said slot means defined within other ones of said plurality of different machine tool tables;

first bore means defined within said any one of said plurality of different workpiece fixtures, the diametrical extent of said first bore means defined within said any one of said plurality of different workpiece fixtures being of the same standardized dimensional value within all of said different workpiece fixtures; and each one of said plurality of different dowel pins having a first section, the width dimension of which substantially corresponds to said singularly specific width dimension of said any one of said plurality of different machine tool table slot means for permitting disposition of a particular corresponding one of said dowel pins within said corresponding slot means of said any one of said plurality of different machine tool tables, and a second section having a diametrical extent which has a dimensional value which is substantially the same as said standardized dimensional value of said first bore means defined within said any one of said plurality of different workpiece fixtures so as to be capable of operatively interfacing with all of said different workpiece fixtures, whereby once a particular one of said plurality of different dowel pins is disposed within said corresponding one of said plurality of different machine tool tables, any one of said plurality of different workpiece fixtures may be readily utilized in conjunction with said any one of said plurality of different machine tool tables in a properly aligned manner.

2. A universal dowel pin system as set forth in claim 1, wherein:
   said slot means defined within said particular machine tool table has an inverted T-shaped configuration.

3. A universal dowel pin system as set forth in claim 2, wherein:
   said first section of said dowel pin is disposed within the stem section of said inverted T-shaped slot means defined within said particuar machine tool table.

4. A universal dowel pin system as set forth in claim 1, wherein:
   said first section of said dowel pin has a substantially square-shaped configuration as seen in horizontal cross-section.

5. A universal dowel pin system as set forth in claim 1, wherein:
   said second section of said dowel pin has a substantially cylindrical configuration.

6. A universal dowel pin system as set forth in claim 1, further comprising:
   second bore means defined within said any one of said plurality of different workpiece fixtures, the diametrical extent of said second bore means defined within said any one of said plurality of different workpiece fixtures being of a standardized dimensional value within all of said different workpiece fixtures;
   insert means having a diametrical extent which has a dimensional value which is substantially the same as said standardized dimensional value of said second bore means defined within said any one of said plurality of different workpiece fixtures so as to be capable of permanent insertion within said any one of said all of said different workpiece fixtures; and
   said first bore means is defined within said insert means.

7. A universal dowel pin system as set forth in claim 1, further comprising:
   adjustment screw means threadedly disposed within the bottom of said first section of said dowel pin for adjusting the disposition of said dowel pin within said particular machine tool table slot means.

8. A universal dowel pin system as set forth in claim 1, wherein:
   said particular machine tool table is a vertical milling machine tool table.

9. A universal dowel pin system as set forth in claim 4, wherein:
   said second section of said dowel pin has substantially cylindrical configuration.

10. A universal dowel pin system as set forth in claim 9, wherein:
    said first and second sections of said dowel pin are integrally formed together.

11. A universal dowel pin system as set forth in claim 9, wherein:

the width dimension of one side of said square-shaped first section is greater than the diametrical extent of said cylindrical second section.

12. A universal dowel pin system for properly aligning, by means of any one of a plurality of different dowel pins, any one of a plurality of different workpiece fixtures with respect to any one of a plurality of different machine tool tables in connection with which it is desired to employ said any one of said plurality of different workpiece fixtures, comprising:

slot means defined within said any one of said plurality of different machine tool tables, the width dimension of said slot means defined within said any one of said plurality of different machine tool tables being singularly specific to said any one of said plurality of different machine tool tables and different from the width dimension of said slot means defined within other ones of said plurality of different machine tool tables;

bore means defined within said any one of said plurality of different workpiece fixtures, the diametrical extent of said bore means defined within said any one of said plurality of different workpiece fixtures having a predetermined value such that said bore means defined within all of said plurality of different workpiece fixtures is of the same uniformly standardized dimensional value; and each one of said plurality of different dowel pins having a first section, the width dimension of which is customized so as to substantially correspond to that of said singularly specific width dimension of said any one of said plurality of different machine tool table slot means for permitting disposition of a particular corresponding one of said dowel pins within said particularly corresponding machine tool table slot means of said any one of said plurality of different machine tool tables, and a second section having a diametrical extent which has a dimensional value which is substantially the same as said standardized dimensional value of said bore means defined within said any one of said plurality of different workpiece fixtures so as to be capable of universally interfacing with all of said different workpiece fixtures, whereby once a particular one of said plurality of different dowel pins is disposed within said corresponding one of said plurality of different machine tool tables, said corresponding machine tool table is capable of universally interfacing with any one of said plurality of different workpiece fixtures through means of said uniformly standardized bore means defined within all of said plurality of different workpiece fixtures and said uniformly standardized second sections of said dowel pins.

13. A universal dowel pin system as set forth in claim 12, wherein:

said slot means defined within said particular machine tool table has an inverted T-shaped configuration.

14. A universal dowel pin system as set forth in claim 13, wherein:

said first section of said dowel pin is disposed within the stem section of said inverted T-shaped slot means defined within said particular machine tool table.

15. A universal dowel pin system as set forth in claim 12, further comprising:

adjustment screw means threadedly disposed within the bottom of said first section of said dowel pin for adjusting the disposition of said dowel pin within said particular machine tool table slot means.

16. A universal dowel pin system for properly aligning any one of a plurality of different workpiece fixtures with respect to any one of a plurality of different machine tool tables in connection with which it is desired to employ said any one of said plurality of different workpiece fixtures, comprising:

slot means defined within each of said plurality of different machine tool tables, the width dimensions of each of said slot means defined within each of said plurality of different machine tool tables being singularly specific to each one of said plurality of different machine tool tables and different from the width dimension of said slot means defined within other ones of said plurality of different machine tool tables;

bore means defined within said any one of said plurality of different workpiece fixtures, the diametrical extent of said bore means defined within said any one of said plurality of different workpiece fixtures having a predetermined value such that said bore means defined within all of said plurality of different workpiece fixtures is of the same uniformly standardized dimensional value; and a plurality of dowel pins each having a first section, the width dimension of which is customized so as to substantially correspond to respective ones of said singularly specific width dimensions of said plurality of different machine tool table slot means, for respective disposition within said plurality of corresponding machine tool table slot means, and a second section having a diametrical extent which has dimensional value which is substantially the same as said uniformly standardized dimensional value of said bore means defined within said any one of said plurality of different workpiece fixtures so as to be capable of universally interfacing with all of said different workpiece fixtures, whereby once said plurality of dowel pins are respectively disposed within said corresponding ones of said plurality of different machine tool tables, each one of said different machine tool tables is capable of universally interfacing with any one of said plurality of different workpiece fixtures through means of said universally standardized bore means defined within all of said plurality of different workpiece fixtures and said uniformly standardized second sections of said plurality of different dowel pins.

17. A universal dowel pin system as set forth in claim 16, wherein:

said slot means defined within each of said plurality of particular machine tool tables has an inverted T-shaped configuration.

18. A universal dowel pin system as set forth in claim 17, wherein:

said first section of each of said dowel pins is disposed within the stem section of said inverted T-shaped slot means defined within each of said plurality of particular machine tool tables.

19. A universal dowel pin system as set forth in claim 16, further comprising:

adjustment screw means threadedly disposed within the bottom of said first section of each of said dowel pins for adjusting the disposition of each of said plurality of dowel pins within each of said plurality of particular machine tool table slot means.

20. A universal dowel pin system as set forth in claim 12, wherein:
   at least two dowel pins are disposed within said slot means of said particular machine tool table and said any one of said workpiece fixtures for properly aligning said any one of said workpiece fixtures relative to said particular machine tool table.

* * * * *